(12) United States Patent
Jang et al.

(10) Patent No.: US 12,289,024 B2
(45) Date of Patent: Apr. 29, 2025

(54) MOTOR WITH BIDIRECTIONAL TERMINALS

(71) Applicant: KEYANG ELECTRIC MACHINERY CO., LTD., Seoul (KR)

(72) Inventors: Soo gil Jang, Hwaseong-si (KR); Ho Gun Lee, Hwaseong-si (KR); Young ho Gee, Yongin-si (KR)

(73) Assignee: KEYANG ELECTRIC MACHINERY CO., LTD., Seoul (KR)

( * ) Notice: Subject to any disclaimer, the term of this patent is extended or adjusted under 35 U.S.C. 154(b) by 258 days.

(21) Appl. No.: 18/073,011

(22) Filed: Dec. 1, 2022

(65) Prior Publication Data
US 2023/0208265 A1 Jun. 29, 2023

(30) Foreign Application Priority Data
Dec. 24, 2021 (KR) .................. 10-2021-0187692

(51) Int. Cl.
*H02K 27/22* (2006.01)
*H01R 39/26* (2006.01)
*H01R 39/38* (2006.01)
*H02K 5/14* (2006.01)
*H02K 13/10* (2006.01)

(52) U.S. Cl.
CPC ............. *H02K 27/22* (2013.01); *H01R 39/26* (2013.01); *H02K 5/148* (2013.01); *H02K 13/10* (2013.01)

(58) Field of Classification Search
CPC .... H01R 39/38; H01R 39/385; H01R 39/383; H02K 13/00; H02K 13/006; H02K 5/14; H02K 5/145
USPC ........................................ 310/239; 174/128.1
See application file for complete search history.

(56) References Cited

U.S. PATENT DOCUMENTS

| | | | |
|---|---|---|---|
| 5,717,271 A | 2/1998 | Aoki et al. | |
| 7,528,319 B2 * | 5/2009 | Kondo | H01B 3/445 |
| | | | 174/36 |

FOREIGN PATENT DOCUMENTS

| | | | | |
|---|---|---|---|---|
| GB | 2244689 A | 12/1991 | | |
| JP | 2014099957 A | 5/2014 | | |
| JP | 2015070658 A | 4/2015 | | |
| JP | 2016007127 A | 1/2016 | | |
| JP | 2018-152938 | * | 9/2018 | ............... H02K 5/22 |
| JP | 2018152938 A | 9/2018 | | |
| KR | 100901304 B1 | 6/2009 | | |
| KR | 20150024182 A | 3/2015 | | |
| KR | 10-2101713 B1 | 4/2020 | | |

* cited by examiner

*Primary Examiner* — Burton S Mullins
(74) *Attorney, Agent, or Firm* — NKL Law; Jae Youn Kim

(57) ABSTRACT

The present disclosure relates to a motor with bidirectional terminals. According to the present disclosure, as the brush terminals are installed on both the left and right sides of the upper surface of the brush card assembly, it is possible to prevent the assembly defects of the motor due to the erroneous assembly of the brush terminals.

1 Claim, 7 Drawing Sheets

MOTOR WITH BIDIRECTIONAL TERMINALS

TECHNICAL FIELD

The present disclosure relates to a motor with bidirectional terminals capable of preventing assembly defects of a motor due to incorrect assembly of a brush terminal by installing the brush terminals on both the upper left and right sides of a brush card assembly.

BACKGROUND ART

In general, a motor converts electrical energy into mechanical energy, and components may be largely divided into a rotor and a stator. The stator is fixed, and the rotor rotates relative to the stator.

Here, the rotor is configured to interact electromagnetically with the stator. As a result, the motor is rotated by a force acting between the magnetic field generated by the stator and rotor and the current flowing in the coil.

In general, the motor may be divided into a brush motor and a brushless motor (BLDC motor). Among them, brush motors are widely used in various industrial environments because they are relatively inexpensive compared to brushless motors.

In a brush type permanent magnet motor, a brush card assembly transfers external power to a coil surrounding the internal rotor. To this end, a terminal for receiving external power, a choke coil, a brush holder, and a brush are installed in the brush card assembly. Here, the brush is in contact with a commutator installed on a drive shaft of the motor, and the brush is elastically supported by a spring to be in close contact with the commutator.

In the conventional motor as described above, the terminal installed on the brush card assembly is arranged in one direction, and a pair of terminals consisting of (+) and (−) poles is designed to be disposed only on either the left or right side of the brush card assembly.

A motor including a conventional terminal is disclosed in Korean Patent Registration Publication No. 10-2101713.

As the conventional terminal is installed only on one of the left or right side of the brush card assembly, there is a problem that the terminal is frequently misassembled when an operator assembles several types of motors in the process of producing the motor.

That is, in the process of assembling the brush card assembly by the operator, the terminal is designed to be placed on the left (LH) side of the brush card, but the assembly direction of the motor is confused and assembled in the right (RH) direction, which often causes assembly defects that the terminal may not be connected to the main power source.

Documents of Related Art (Patent Document 1) Korea Patent No. 10-2101713

DISCLOSURE

Technical Problem

The purpose of the present disclosure is to solve the problems of the prior art as described above, and to provide a motor with bidirectional terminals capable of preventing assembly failure of the motor due to erroneous assembly of a brush terminal by installing brush terminals on both the left and right sides of the upper surface of the brush card assembly.

Technical Solutions

According to the features of the present disclosure to achieve the above objects, a motor with bidirectional terminals comprises: a yoke assembly forming a magnetic field; an armature assembly comprising a coil wound around a core slot formed in a core, disposed inside the yoke assembly and rotating around a rotation shaft; a brush card assembly fixed to one side of the yoke assembly and having a brush installed therein to supply power to a commutator installed in the armature assembly; and a brush terminal installed to protrude from the upper surface of the brush card assembly and connected to a power supply terminal to supply power to the brush card assembly. A plurality of the brush terminals are installed on the upper surface of the brush card assembly.

The brush terminals are installed on the left and right sides of the upper surface of the brush card assembly, respectively.

The brush terminal consists of a pair of terminals having a (+) pole and a (−) pole.

The brush card assembly includes: a brush card housing with an installation space therein; a brush holder installed in the brush card housing and having a brush mounted therein; a choke coil installed on one side of the brush holder and supplying power to the brush; and a lead wire made of a steel wire and electrically connecting the brush terminal and the choke coil.

The lead wire includes: a (+) pole lead wire connected to the (+) pole terminal on the left and the (+) pole terminal on the right, respectively, and connected to the choke coil; and a (−) pole lead wire connected to the (−) pole terminal on the left and the (−) pole terminal on the right, respectively, and connected to the choke coil.

Advantageous Effect

A motor with bidirectional terminals according to the present disclosure may have the following effects.

In the present disclosure, as brush terminals are installed on both the left and right sides of the upper surface of a brush card assembly, it is possible to prevent assembly defects of the motor due to misassembly of the brush terminal by an operator in the process of assembling the motor, while increasing assembly productivity of the motor.

In addition, as multiple brush terminals are installed, mold production in accordance with the installation direction of the brush terminal may be minimized, and there is an advantage that motor parts may be shared.

MODE FOR DISCLOSURE

Hereinafter, a preferred embodiment of a motor with bidirectional terminals according to the present disclosure will be described in detail with reference to the accompanying drawings.

Figure 1:
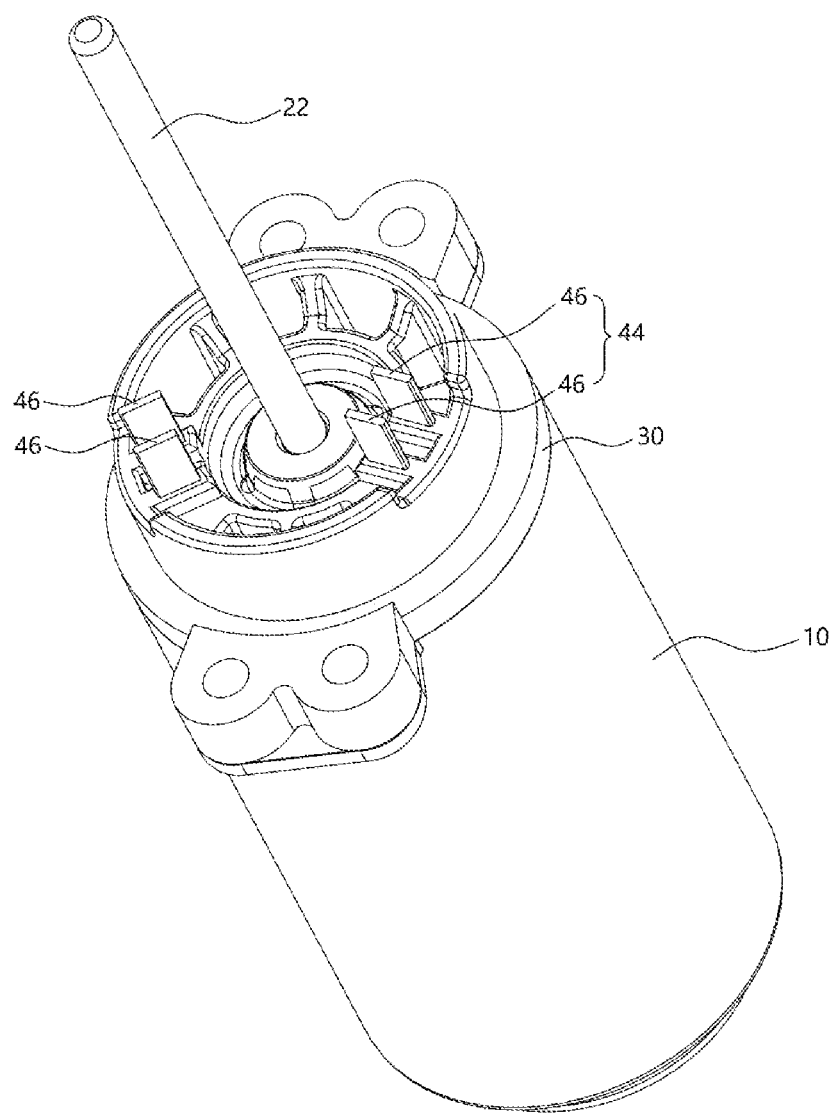
FIG. 1 is a perspective view illustrating a configuration of a preferred embodiment of a motor with bidirectional terminals according to the present disclosure.
Figure 2:
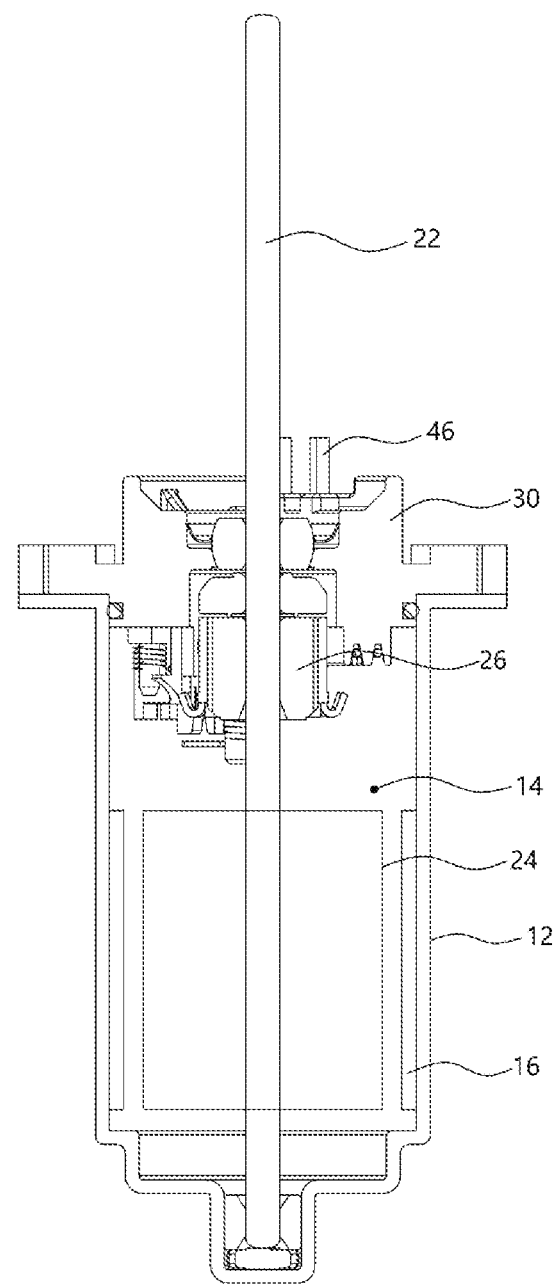
FIG. 2 is a cross-sectional view illustrating a configuration of the preferred embodiment of the motor with bidirectional terminals according to the present disclosure.
Figure 3:
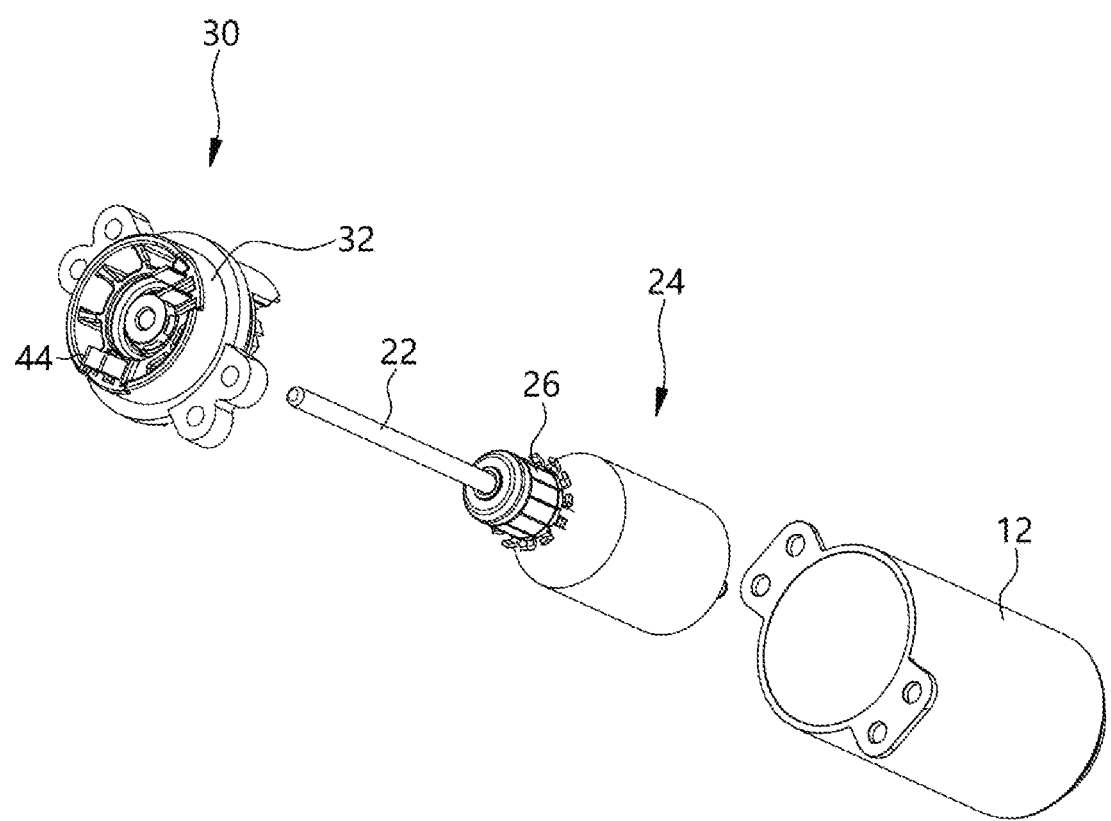
FIG. 3 is an exploded view illustrating the configuration of the preferred embodiment of the motor with bidirectional terminals according to the present disclosure.
Figure 4:
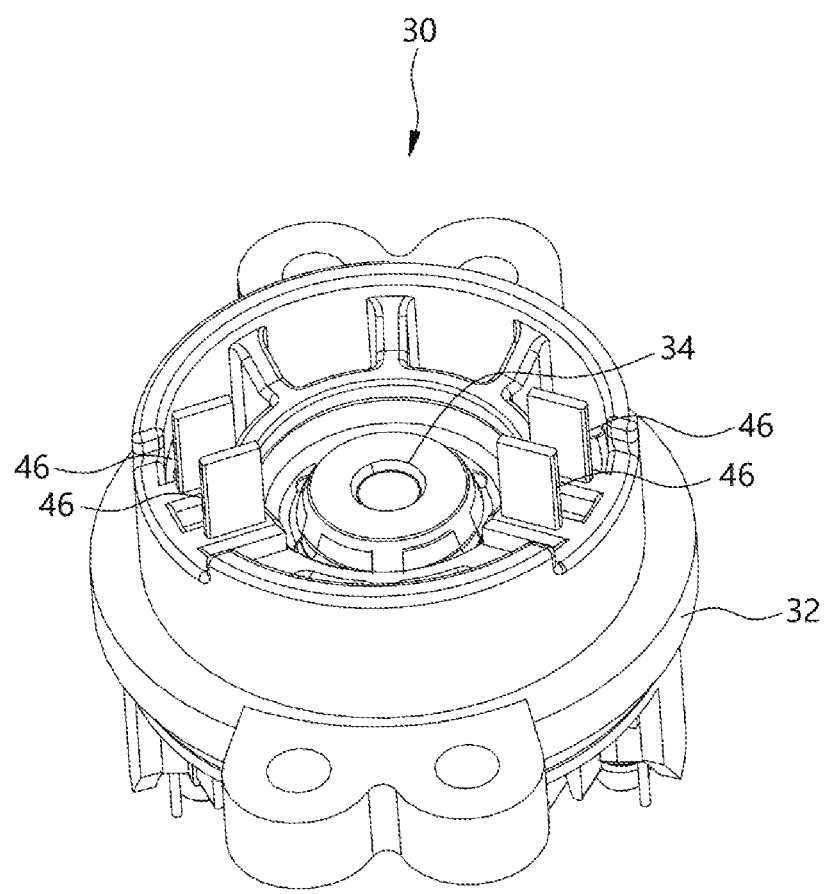
FIG. 4 is a perspective view illustrating a configuration of a brush card assembly constituting the embodiment of the present disclosure.
Figure 5:
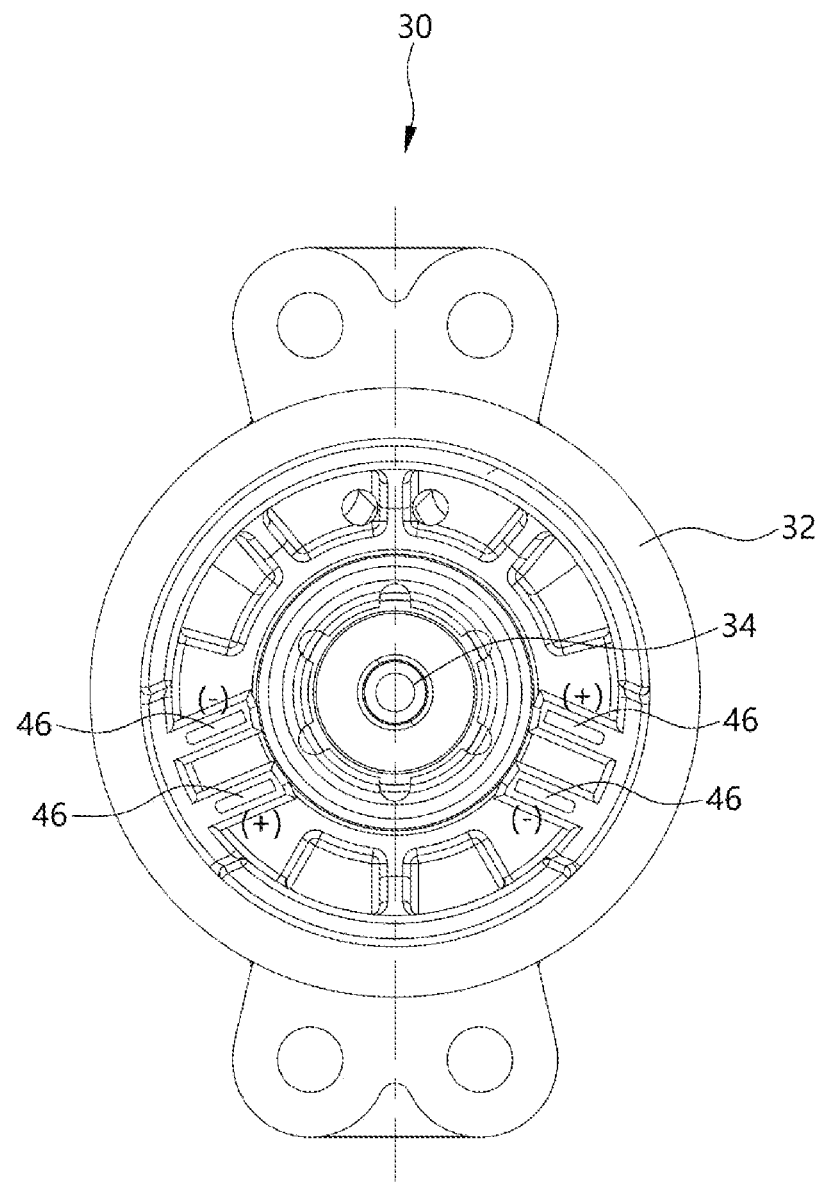
FIG. 5 is a plan view showing the configuration of the brush card assembly constituting the embodiment of the present disclosure.
Figure 6:
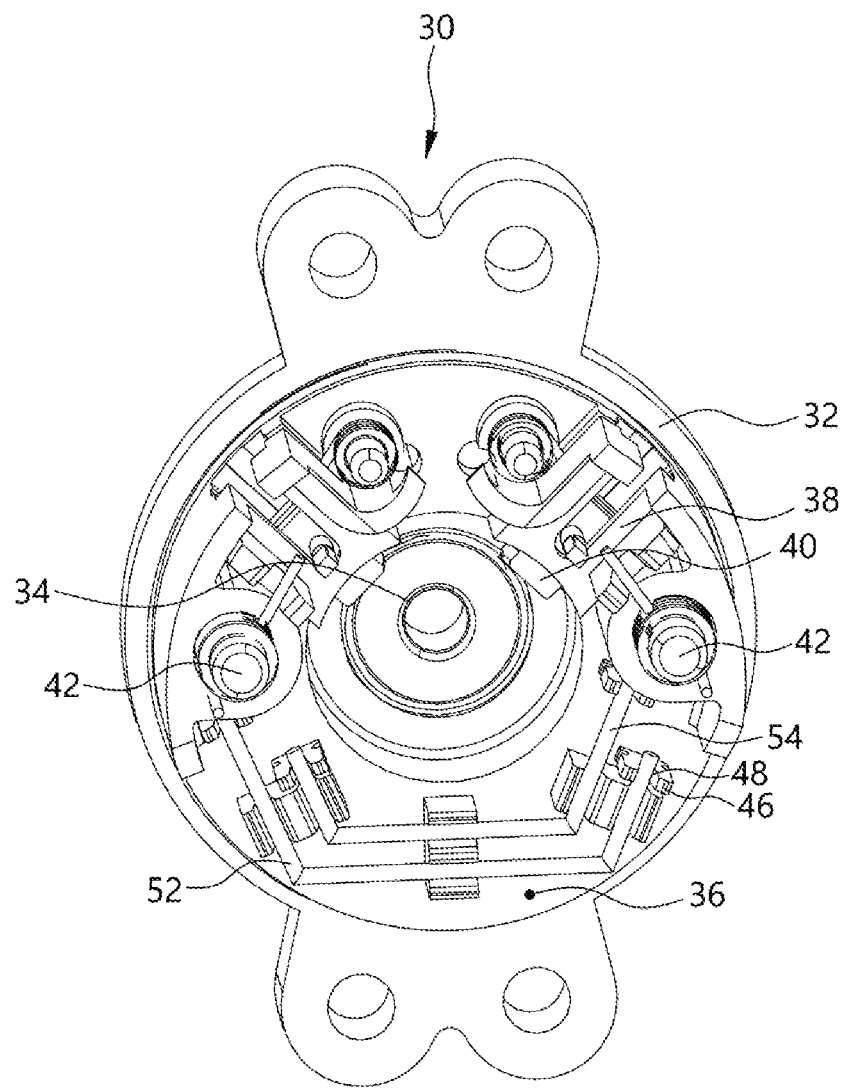
FIG. 6 is a bottom view illustrating a configuration of the brush card assembly constituting the embodiment of the present disclosure.
Figure 7:
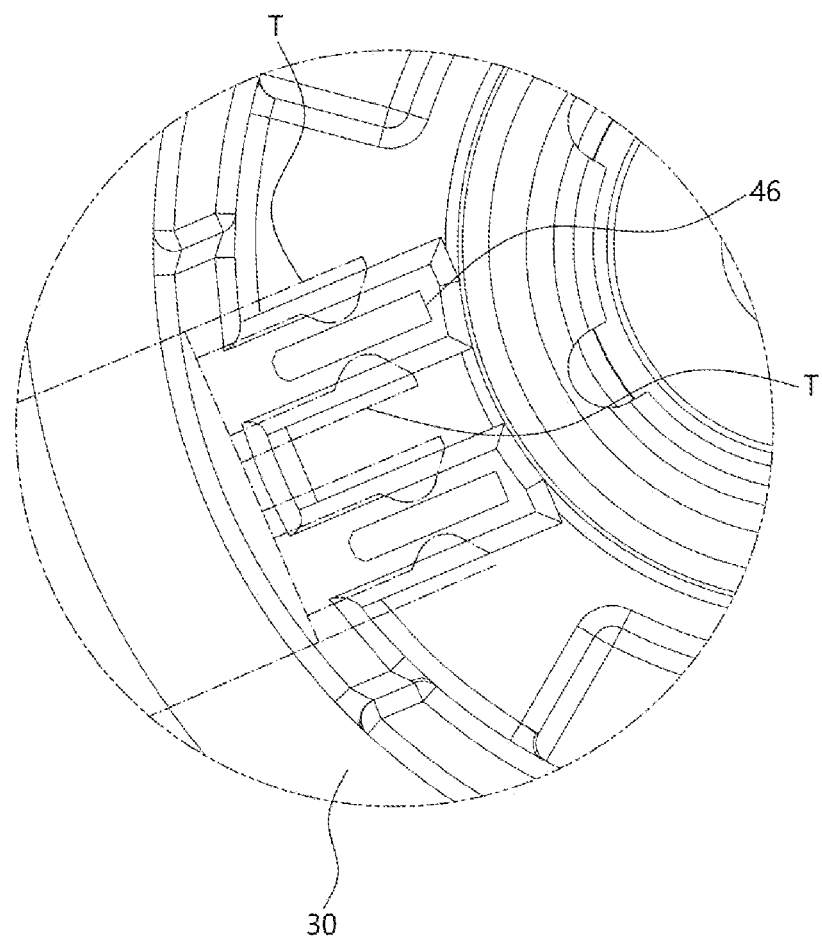
FIG. 7 is an enlarged view illustrating a state in which the brush terminal constituting the embodiment of the present disclosure is connected to a power supply terminal.

FIG. 1 is a perspective view showing the configuration of a preferred embodiment of the motor with bidirectional terminals according to the present disclosure, FIG. 2 is a cross-sectional view showing the configuration of the preferred embodiment of the motor with bidirectional terminals according to the present disclosure, FIG. 3 is an exploded view illustrating the configuration of the preferred embodiment of the motor with bidirectional terminals according to the present disclosure, FIG. 4 is a perspective view illustrating a configuration of a brush card assembly constituting the embodiment of the present disclosure, FIG. 5 is a plan view showing the configuration of the brush card assembly constituting the embodiment of the present disclosure, FIG. 6 is a bottom view illustrating a configuration of the brush card assembly constituting the embodiment of the present disclosure, and FIG. 7 is an enlarged view illustrating a state in which the brush terminal constituting the embodiment of the present disclosure is connected to a power supply terminal.

As shown in these drawings, the motor with bidirectional terminals of the present disclosure comprises: a yoke assembly 10 forming a magnetic field; an armature assembly 20 comprising a coil wound around a core slot formed in a core 24, disposed inside the yoke assembly 10 and rotating around a rotation shaft 22; a brush card assembly 30 fixed to one side of the yoke assembly 10 and having a brush 40 installed therein to supply power to a commutator 26 installed in the armature assembly 20; and a brush terminal 44 installed to protrude from the upper surface of the brush card assembly 30 and connected to a power supply terminal to supply power to the brush card assembly 30. The present disclosure is characterized in that a plurality of the brush terminals 44 are installed on the upper surface of the brush card assembly 30.

First, the yoke assembly and the armature assembly among the configurations of the present disclosure will be described in detail.

The yoke assembly 10 and the armature assembly 20 rotate relative to each other, and more precisely, the armature assembly 20 accommodated inside the fixed yoke assembly 10 rotates with respect to the yoke assembly 10. To this end, the armature assembly 20 converts power from electrical energy to rotational energy.

In the structure of the yoke assembly 10, the yoke 12 having a cylindrical shape or a rectangular parallelepiped shape forms an external frame of the yoke assembly 10. The yoke 12 is inserted into a separate motor housing (not shown), and a gear assembly or the like may be coupled to one side of the motor housing.

There is a rotation space 14 inside the yoke 12, and a fixing magnet 16 is installed on the inner circumferential surface of the rotation space 14. The fixing magnet 16 provides a magnetic force for rotating the armature assembly 20 to be described later.

That is, the yoke assembly 10 forms a magnetic field. A plurality of fixing magnets 16 are provided along the inner surface of the rotation space 14, and are installed to be spaced apart therebetween.

The armature assembly 20 is installed inside the yoke assembly 10. The armature assembly 20 receives power from the outside and converts the electrical energy into rotational energy, by which the armature assembly 20 may relatively rotate with respect to the yoke 12. When the armature assembly 20 is rotated, the rotation shaft 22 rotates together at the center thereof, and the rotational force may be transmitted to a gear assembly (not shown). Since the rotation shaft 22 is coupled along the center of the armature assembly 20, the rotation shaft 22 may be viewed as a rotation center. A core 24 is formed in the frame of the armature assembly 20, which may be seen as a substantially cylindrical shape surrounding the rotation shaft 22 at the center.

The core 24 is configured by stacking a plurality of core plates. The core plate is made of a thin metal steel plate, and when the core plates having the same shape are stacked, the core plates may have a three-dimensional shape as shown in FIG. 3. A coil (enameled copper wire, not shown) is wound around the core 24.

The coil constitutes the armature assembly 20 as the coil is repeatedly wound around the core slot (not shown) radially extending from the core 24.

The brush card assembly 30 is installed on the upper portion of the yoke 12. The brush card assembly 30 receives power and signals from the outside and transmits them to the armature assembly 20, and the external power and signals are transmitted through a power supply terminal T to be described later. The brush card assembly 30 is connected to the commutator 26 of the motor to supply power to the commutator, and the commutator 26 transmits the power to the coil to rotate the armature assembly 20.

The brush card assembly 30 is largely composed of a brush card housing 32, a brush holder 38, a brush 40, a choke coil 42, a brush terminal 44, and a lead wire 50.

The brush card housing 32 forms a frame of the brush card assembly 30. The brush card housing 32 has a substantially circular shape and is coupled to the upper portion of the yoke assembly 10. When the brush card assembly 30 and the yoke assembly 10 are assembled, the commutator 26 of the armature assembly 20 may face the brush 40 to be described later.

Inside the brush card housing 32, there is an empty installation space 36, and in the center of the installation space 36, there is a center hole 34 into which the rotation shaft 22 is fitted. A plurality of parts may be installed in the installation space 36, and in this embodiment, two or more brush holders 38 and brush 40 are installed in the installation space 36.

The brush holder 38 and the brush 40 are installed on the lower surface of the brush card housing 32. The brush 40 is installed inside the brush holder 38 and disposed toward the commutator 26.

A choke coil 42 is installed on the lower surface of the brush card housing 32. The choke coil 42 is a general choke coil, and a detailed description thereof will be omitted. The choke coil 42 may be installed on one side of each brush holder 38 to supply power to the brush 40.

A brush terminal 44 is installed on the upper surface of the brush card housing 32. The brush terminal 44 is made of a metal material and is formed of a rectangular plate. A wire connection groove 48 is formed in the center of the lower end of the brush terminal 44. A lead wire 50, which will be described later, is inserted into the wire connection groove 48.

The brush terminal 44 includes a pair of terminals 46 having a (+) pole and a (−) pole. The brush terminals 44 are installed on the left and right sides of the brush card housing 32 such that upper ends protrude upward, respectively. As shown in FIG. 7, the power supply terminal T is connected to the brush terminal 44 to supply power to the brush card assembly 30.

The brush terminal 44 may be installed on the left and right sides, respectively, based on the central shaft of the brush card housing 32. As the brush terminals 44 are equally disposed on the left and right sides of the brush card housing 32, one of the two brush terminals 44 may be connected to the power supply terminal T during the assembly process of the motor.

That is, even if an operator confuses the assembly direction of the brush terminal 44 in the process of assembling the motor, the brush terminals 44 are disposed on the left and right sides, equally, thereby preventing assembly defects of the motor due to misassembly of the brush terminal 44 and improving the assembly productivity of the motor.

Lead wires 50 are installed on the lower surface of the brush card housing 32. The lead wires 50 include a (+) pole lead wire 52 and a (−) pole lead wire 54. The lead wire 50 is a general lead wire and a detailed description thereof will be omitted. The (+) pole lead wires 52 are connected to the wire connection grooves 48 of each the (+) pole terminal 46 disposed on the left and right sides of the brush card housing 32, and ends of the (+) pole lead wires 52 are connected to the choke coil 42. The (+) pole lead wire 52 is connected to the (+) pole terminals 46 to transfer the (+) electrode to the choke coil 42.

The (−) pole lead wires 54 are respectively connected to the wire connection grooves 48 of each the (−) pole terminal 46 disposed on the left and right sides of the brush card housing 32, and ends of the (−) pole lead wires 54 are connected to the choke coil 42. The (−) pole lead wires 54 are connected to the (−) pole terminals 46 to transfer the (−) electrode to the choke coil 42.

That is, the (+) pole lead wire 52 and the (−) pole lead wire 54 are simultaneously connected to the (+) and (−) poles terminals 46 disposed on the left and right sides of the brush card housing 32.

Therefore, when the power supply terminal (T) is connected to any one of the brush terminals 44 disposed on the left and right sides of the brush card housing 32, power may be supplied to the choke coil 42

Next, looking at the assembly process of the motor with bidirectional terminals according to the present disclosure, the operator combines the armature assembly 20 inside the yoke assembly 10. In a state where the armature assembly 20 is coupled to the yoke assembly 10, the rotation shaft 22 of the armature assembly 20 is positioned at the center, and the brush card assembly 30 is coupled and fixed to the upper side of the yoke assembly 10.

The rotation shaft 22 of the armature assembly 20 is installed through the center hole 34 of the brush card assembly 30, and the brush 40 is installed at a position adjacent to the commutator 26 of the armature assembly 20.

When the assembly of the brush card assembly 30 and the yoke assembly 10 are completed, the operator combines the motor with bidirectional terminals with a motor connection portion where the power supply terminal T is disposed.

The power supply terminal T may be disposed on the left or right side of the motor according to the specifications of the motor. Since the brush terminals 44 are installed on both the left and right sides of the upper surface of the brush card assembly 30, the operator may electrically connect the power supply terminal (T) and the brush terminals 44 without having to check the arrangement position of the power supply terminal (T).

As described above, as the brush terminals 44 are installed on both the left and right sides of the upper surface of the brush card assembly 30, even if the operator is confused with the assembly direction of the brush terminals 44 in the process of assembling the motor, it is possible to prevent assembly defects of the motor due to erroneous assembly of the brush terminals 44, and increase the assembly productivity of the motor.

The scope of the present disclosure is not limited to the embodiment described above, and many other modifications based on the present disclosure may be possible for those skilled in the art within the above technical scope.

DESCRIPTION OF THE REFERENCE NUMERALS IN THE DRAWINGS

| | |
|---|---|
| 10 Yoke assembly | 12 Yoke |
| 14 rotation space | 16 fixing magnet |
| 20 amateur assembly | 22 rotation shaft |
| 26 commutator | 30 brush card assembly |
| 32 brush card housing | 34 center hall |
| 36 installation space | 38 brush holder |
| 40 brush | 42 choke coil |
| 44 brush terminal | 46 terminal |
| 50 lead wire | |

The invention claimed is:

1. A motor with bidirectional terminals comprising:
a yoke assembly forming a magnetic field;
an armature assembly comprising a coil wound around a core slot formed in a core, disposed inside the yoke assembly, coupled to a rotation shaft, and configured to rotate relative to the yoke;
a brush card assembly fixed to one side of the yoke assembly and having a brush installed therein to supply power to a commutator installed on the armature assembly; and
a plurality of brush terminals, each of the plurality of brush terminals installed on left and right sides of an upper surface of the brush card assembly to protrude from the upper surface and connected to a power supply terminal to supply power to the brush card assembly,
wherein each of the plurality of the brush terminals comprises a pair of terminals having a (+) pole and a (−) pole,
wherein the brush card assembly includes:
a brush card housing with an installation space therein;
a choke coil installed on one side of the brush holder and supplying power to the brush; and
a lead wire made of a steel wire and electrically connecting each of the brush terminals and the choke coil, and
wherein the lead wire includes:
a (+) pole lead wire connected to a (+) pole terminal on a left side of the brush card housing and another (+)

pole terminal on a right side of the brush card housing, respectively, and connected to the choke coil; and a (−) pole lead wire connected to a (−) pole terminal on the left side of the brush card housing and another (−) pole terminal on the right side of the brush card housing, respectively, and connected to the choke coil.

\* \* \* \* \*